Feb. 24, 1942.   H. H. PARRETT   2,274,501
MANUFACTURE OF PROJECTION SCREENS
Filed Feb. 15, 1940
FIG. 1.
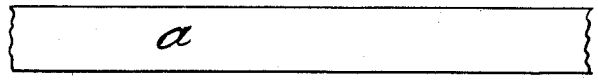
FIG. 2.
FIG. 3.   FIG. 4.
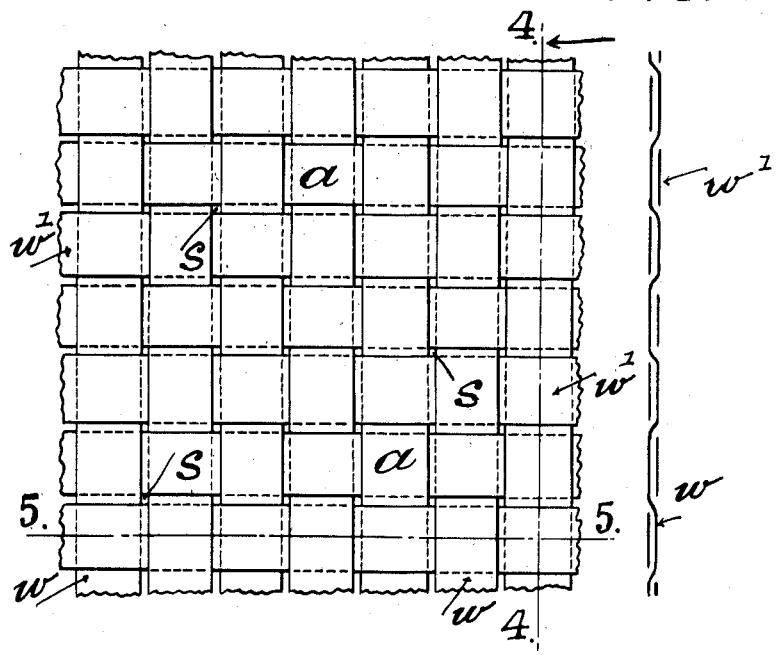
FIG. 5.
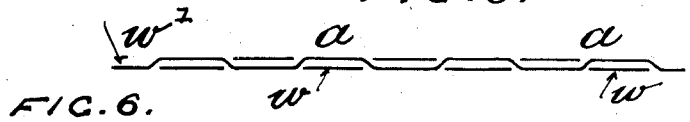
FIG. 6.   FIG. 7.
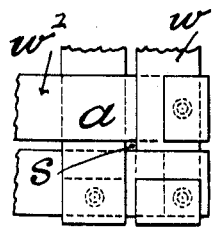 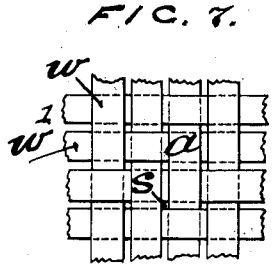
INVENTOR:
HENRY HILTON PARRETT
Frances E. Boyce
ATTORNEY

UNITED STATES PATENT OFFICE 2,274,501

MANUFACTURE OF PROJECTION SCREENS

Henry Hilton Parrett, Disley, England, assignor to C. H. Johnson and Sons Limited, Manchester, England, a British company Application February 15, 1940, Serial No. 319,017
In Great Britain February 16, 1939

3 Claims. (Cl. 88—24)

This invention relates to improvements in and in the manufacture of projection screens. The object is to produce a fire-proof projection screen having a naturally light surface with uninterrupted flat areas of appreciable size and in which uniformly distributed apertures of adequate size for the uniform passage of sound waves are obtained as a result of the method of manufacture.

According to the invention the fire-proof projection screen is woven from long lengths of foil or rather from lengths of vary thin flat strips or ribbons of metal or alloy and relatively of considerable width, and which are used as warp and weft, said very thin flat metallic strips being woven together either plain or twill and producing a succession of flat areas of appreciable size and woven in such manner as to produce automatically by the relative disposition of the thin metallic flat warp and weft strips in the act of weaving, rectangular apertures at uniform intervals in the length and breadth of the projection screen for the passage of sound, said woven metallic projection screen being suitably finished off and re-inforced or framed as to the selvedges.

There are other features in connection with the production of a projection screen, as defined above, and which are hereafter referred to in the detailed description which follows.

In such description, reference is made to the diagrammatic drawing, wherein:

Fig. 1 shows a face view of a broken length of thin flat metallic strip or ribbon such as is used as warp and weft.

Fig. 2 is an edge view of said thin flat metallic strip.

Fig. 3 shows a broken portion of a projection screen woven in the manner of a plain weave from long lengths of thin flat metallic strips in manner to produce a complete screen with flat areas of appreciable size and in which the sound apertures are produced by the act of weaving.

Fig. 4 is a section on the line 4—4, Fig. 3.

Fig. 5 shows a section on the line 5—5, Fig. 3.

Fig. 6 indicates one way of finishing off the selvedges of the woven projection screen.

Fig. 7 indicates a fragmentary view of a projection screen woven twill.

The screen is produced from lengths of foil or rather long lengths of thin flat metallic strips such as shown by the broken lengths in Figs. 1 and 2.

Such thin flat metallic strips may be made from suitable metal or alloy as for instance brass, but use is advantageously made of aluminium on account of its brightness and lightness.

The long lengths or thin flat metallic strips are marked $a$ and are made as thin as possible consistent with handling in manufacture and use of the screen, and in the case of aluminium the thickness may be somewhere about 30 S. W. G. (.0124″) or with brass about 33 S. W. G. (.010″). The metallic strips $a$ should not be less than about ¼″ wide, because of expense and lessened areas, nor greater than about 1″ wide as the sound apertures would be too infrequent, and it has been found that thin metallic strips of aluminum about ½″ wide and about 30 gauge thick are most suitable.

Strips $a$ of such metal and such dimensions are therefore supposed to be shown in the drawing, and they are used both as warp $w$ and weft $w^1$ in the weaving act which produces the screen, a portion of which is indicated by Fig. 3. The strips in the weaving act in the example shown are supposed to be spaced at a distance of about ³⁄₆₄″ from each other both in warp and weft direction, and consequently sound apertures $s$ about ³⁄₆₄″ square result at approximately ½″ intervals in every direction.

The sound apertures should amount to not more than a quarter of 1 per cent of the total area of the surface of the screen to permit unrestricted passage of sound and yet to ensure good definition for the picture on the projection screen.

In a screen in which not more than a quarter of 1 per cent of the total surface area consists of space for uninterrupted passage of sound waves, the holes making up this fraction are sufficiently infrequent to allow of good picture definition on solid areas of appreciable size and of sufficient individual size to allow passage of the sound waves without distortion, at the same time they are sufficiently frequent to allow a uniform passage of sound both through all parts of the screen and in all directions from it.

It will be appreciated that a slight crimping or knuckling (shown exaggerated in Figs. 4 and 5) of both the warp and weft strips results as a consequence of the weaving act, which whilst it tends to bind or lock the warp and weft strips, ensures also the production of a substantially uniform or flat surface on both sides of the screen, and gives a certain rigidity to the finished screen, resulting in better definition.

Whilst the use of a plain weave ensures a more uniform surface, the weave might be twill, as shown at Fig. 7.

When the weaving of the projection screen is completed, the slightly projecting extremities of both the warp and weft ends can be bent over in some such manner as indicated by Fig. 6, and the margins then turned over and eyeletted to produce a strong selvedge; or the said ends can be otherwise dealt with to produce a boundary or frame to finish off or re-inforce the selvedges of the screen to enable same to be safely handled.

It has been found that a fire-proof projection screen produced as set forth gives better definition and reflection than the present type of screen, and that same has superior acoustic properties in that clearer notes are transmitted through it.

Any metallic lustre may if desired be removed from the screen or its components by wire or scratch brushing of the surface, or by sand blasting, or by frosting, or the production of an anodic film, by known methods.

The surface of the screen after cleaning or other treatment, or roughening treatment as by sand blasting or otherwise as known, is then painted or sprayed with a thin covering film of white paint or dope as is usual.

The pliable nature of a screen produced according to the invention allows, when desirable, of ready surfacing or of coating or other treatment, because the screen can be rolled-up and treated over a portion of its area at a time, and so in treatment no solid stiff large-size sheet requires to be dealt with.

The method followed according to my invention enables me to produce a screen in one piece sufficiently large to meet normal requirements. There is no need to pierce the screen by any subsequent processes, as sound apertures of ample size and proper spacing result from the manner of weaving. Also, the screen is completely fireproof, and by using aluminium the screen is light in weight and lends itself if desired to certain known treatments with the object of producing a non-reflective surface of low light absorbing quality.

In the usual type of projection screen, the recoating with paint (to maintain a white surface) tends to fill-up the holes for passage of sound. Also, with some screens the material of the screen becomes hard and brittle or perishes resulting in a short life.

With a screen according to the invention the woven ribbon-like metal foundation with flat areas of appreciable size and substantial apertures allows the ready removal of any paint which has become dull and the return of the screen to its initial condition for the application of fresh paint, and the sound apertures being substantial in size with sharp straight boundary edges are not liable to fill-up, nor does the metal of the screen deteriorate rapidly, so that the screen has a long life.

I claim:

1. A fire-proof screen woven from lengths of very thin flat metallic strips of uniform width and relatively of considerable width compared with the thickness, and used both as warp and weft, said very thin flat metallic strips being tightly woven together and slightly knuckled in the weaving act to ensure sufficient rigidity in the screen and due to the thinness of the metallic strips producing a succession of perfectly flat areas of very appreciable size compared with the thickness of the flat metallic strips and producing a reflecting area in a single uniform plane, the very thin flat metallic strips being so woven together as warp and weft as to produce by the relative determinate spacing of warp and weft in the act of weaving, definite and adequate rectangular apertures at regular intervals in the length and breadth of the projection screen for the passage of sound, the said screen having a selvedge to bind the tightly woven warp and weft strips together, the surface of the screen being finished off to ensure good reflection.

2. A fire-proof projection screen as claimed in claim 1, and further distinguished in that the very thin and relatively wide strips constituting both warp and weft, are tightly woven together and knuckled to ensure rigidity and woven in spaced and determinate relationship to produce sound apertures at regular intervals, and in that the very thin and relatively wide strips are of aluminium and that the woven screen is rendered rigid and finished off with a selvedge by bending over the warp and weft strips.

3. A fire-proof projection screen as claimed in claim 1, and distinguished in that the very thin and relatively wide, flat metallic strips are equally spaced both as to warp and weft and are tightly woven together and knuckled to produce a rigid screen with uniform flat areas and that said metallic strips are in thickness of the order of 30 S. W. G. (.0124") and approximately one-half inch wide, whilst the sound apertures are uniformly distributed and of square section and in size about 3/64", the woven screen having its margin finished off to produce a selvedge by bending over the edges of said screen.

HENRY HILTON PARRETT.